Sept. 16, 1969  A. MADRELLE  3,467,413
TRIPLE-SEALING PIPE JOINT
Filed Dec. 14, 1967  2 Sheets-Sheet 1
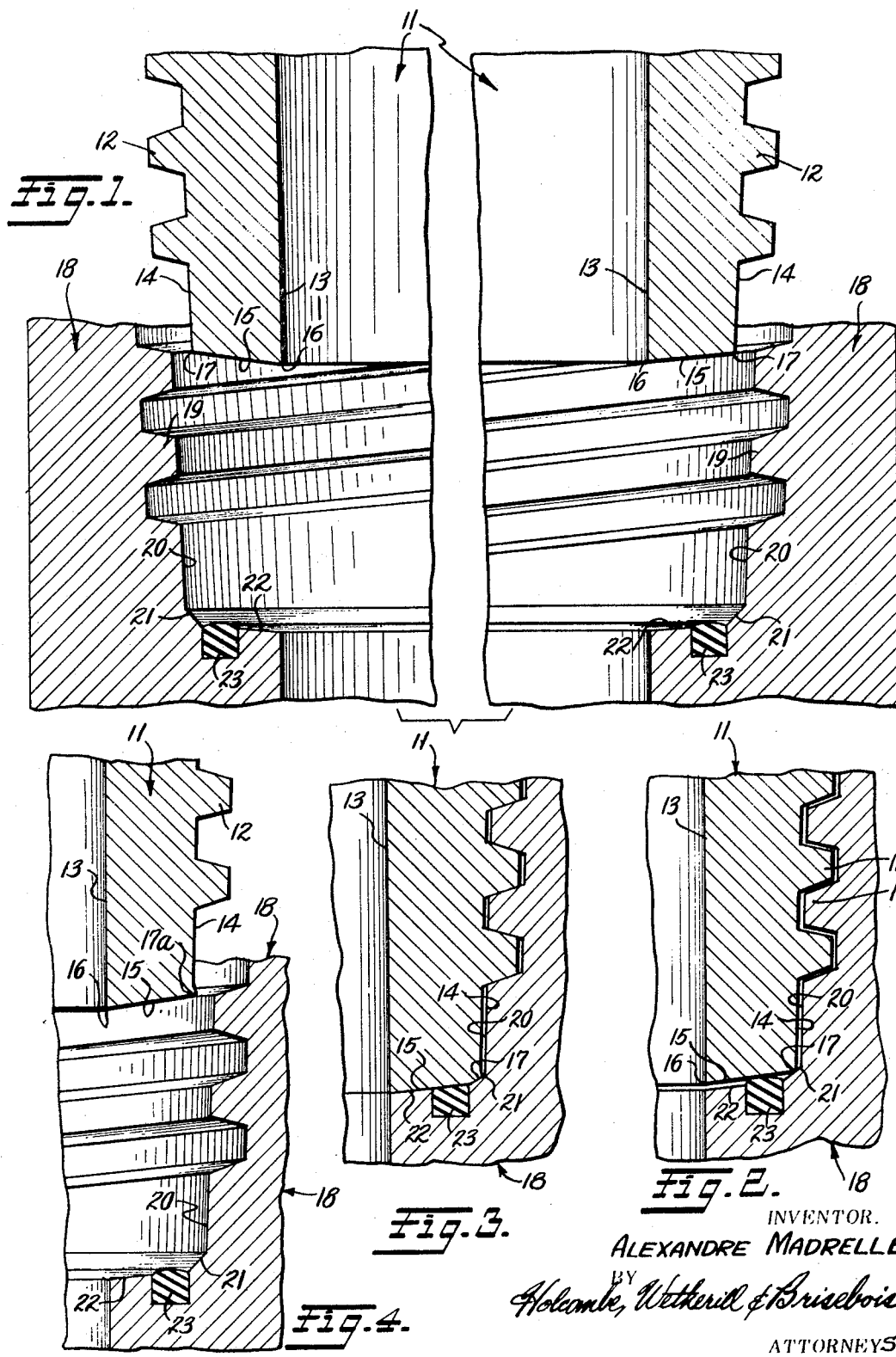
INVENTOR.
ALEXANDRE MADRELLE
BY Holcombe, Wetherill & Brisebois
ATTORNEYS Sept. 16, 1969  A. MADRELLE  3,467,413

TRIPLE-SEALING PIPE JOINT

Filed Dec. 14, 1967  2 Sheets-Sheet 2

INVENTOR.
ALEXANDRE MADRELLE
BY
Holcombe, Wetherill & Brisebois
ATTORNEYS 3,467,413
TRIPLE-SEALING PIPE JOINT
Alexandre Madrelle, Berlaimont, France, assignor to Societe Anonyme dite: Vallourec, Usines a Tubes de Lorraine-Escaut et Vallourec Reunies, Paris, France
Continuation-in-part of application Ser. No. 353,926, Mar. 23, 1964. This application Dec. 14, 1967, Ser. No. 690,529
Claims priority, application France, Mar. 25, 1963, 929,147
Int. Cl. F16l 25/00, 35/00
U.S. Cl. 285—332.2    8 Claims

ABSTRACT OF THE DISCLOSURE

A pipe joint comprising mating tapered surfaces on male and female members, corresponding portions of each tapered surface being threaded, and the tapered surface on the female portion being connected to a shoulder by a beveled portion on which the outer edge of the end of the male member seats. A resilient sealing ring is positioned in an annular recess in the shoulder portion of the female member and is engaged by the end surface of the male member.

---

This application is a continuation-in-part of my copending application, Ser. No. 353,926, filed Mar. 23, 1964, now abandoned.

This invention relates to a joint for connecting pipe sections together, and particularly for connecting pipe sections of uniform inner diameter having tapered, threaded end portions of the type used in deep wells, and in which sealing contact is made between the end surface on the male member and a shoulder in the female member.

My new joint is characterized by the fact that, at the end of the male member, beyond the threaded portion, there is a short unthreaded frusto-conical portion having a diameter such that there is a clearance between it and the inner surface of a corresponding unthreaded portion in the female member while the joint is being made up. At the inner end of the unthreaded portion of the female member is a transverse shoulder connected to the unthreaded portion of the female member by a beveled portion positioned at an angle of about 45° to the longitudinal axis of the pipe section. The arrangement is such that, as the male member is screwed home, the outer edge of its extreme end strikes the beveled portion of the female member and is radially compressed before striking the shoulder of the female member, into which a resilient sealing ring may be set. The result is a thin line seal between the outer edge of the end of the male member and the beveled portion of the female member, in addition to the seal between the end of the male member and the shoulder, and the seal between the end of the male member and the sealing ring.

A preferred embodiment of the joint will now be described with reference to the accompanying drawings, in which:

FIG. 1 is a cross-sectional view showing two mating pipe-sections embodying my invention, just before the edge of the end of the male member encounters the beveled portion of the female member;

FIG. 2 is a similar view showing the same pipe-sections, just as said edge encounters said beveled portion;

FIG. 3 is a similar view showing the joint fully made up;

FIG. 4 shows a joint in the position of FIG. 1, in which the end of the male member has been deformed by repeated use;

Figure 7:
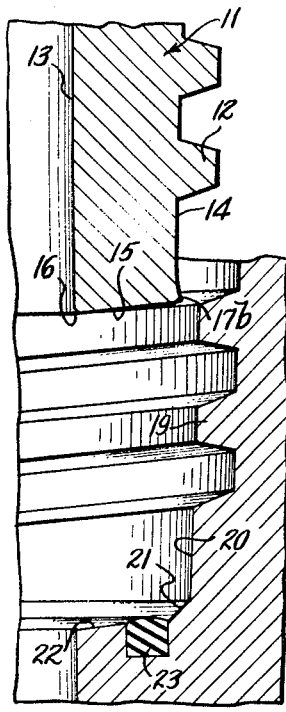
FIG. 7 shows a joint in which the male member is still further deformed in the position of FIG. 1.

Turning now to FIG. 1 it will be seen that the male member 11 is provided with a threaded portion 12 carrying threads which are trapezoidal in section followed by a short part 13 having a smooth, slightly tapered surface 14, and terminates in a slightly convex end surface 15, having an inner edge 16 and a sharp outer edge 17.

The female member 18 is provided with a mating threaded section 19 followed by a short, slightly tapered smooth section 20, a beveled portion 21, and a slightly concave shoulder 22, mating with the surface 15, and recessed to receive a resilient sealing ring 23, which, when not compressed, projects slightly above the surface of the shoulder.

Beginning with the position shown in FIG. 1, the male member is screwed into the female member, at the position shown in FIG. 2 the edge 17 will strike the beveled portion 21. This may take place just before, exactly when, or just after the end surface 15 of the male member strikes the resilient sealing ring 23, so long as it occurs so soon thereafter as to present the sealing ring from being extruded outward of the line of contact between the edge 17 and beveled portion 21. The application of further torque to the male member causes the beveled surface 21 to radially compress the end of the male member until the end surface 15 is finally forced into sealing contact with the shoulder 22, as shown in FIG. 3, so that there are now 3 seals, one between surface 15 and shoulder 22, one between the surface 15 and the sealing ring 23, and one between the edge 17 and beveled surface 21. To some extent, the compression of the end of the male member takes place within the elastic limit of the metal, so that the male end expands part way toward its original dimensions when withdrawn, but to some extent the deformation is permanent.

Figure 6:
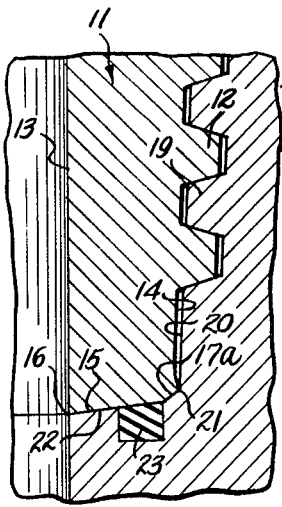
FIG. 6 shows the joint of FIG. 4 fully made up.
Figure 5:
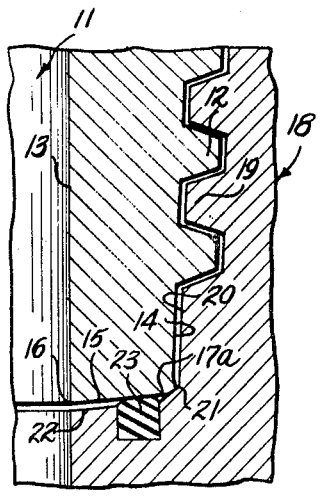
FIG. 5 shows the joint of FIG. 4 in the position of FIG. 2.

FIGS. 4–6 show the successive steps in bringing together the male and female members when the male member has been somewhat deformed by prior use. It will be seen from FIGS. 5 and 6 that while the contact between the slightly blunted edge 17a and beveled portion 21 is no longer line contact, it is along a relatively narrow annular surface, and the end of the male member must still be radially compressed to fully make up the joint, so that there is substantial sealing pressure along this annular surface.

Figure 9:
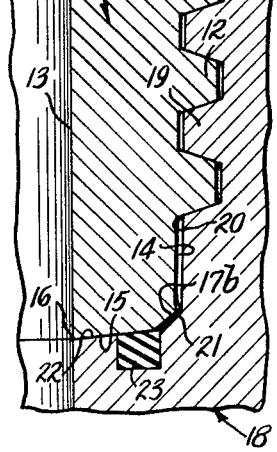
FIG. 9 shows the joint of FIG. 8 fully made up.
Figure 8:
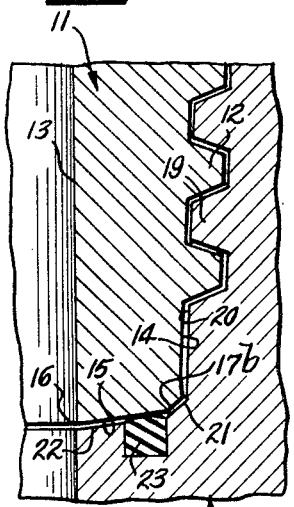
FIG. 8 shows the joint of FIG. 7 in the position of FIG. 2.

FIGS. 7–9 show the successive steps in bringing together a joint in which the end of the male member has been so badly deformed that its badly blunted edge 17b does not strike the beveled portion 21 of the female member at all as the joint is made up. It should be noted, however, that once these pipes are placed in use, they are ordinarily subject to large internal pressures. Since there is a slight clearance between the surface 14 and the surface 20, this pressure in cooperation with the forces created by the making up of the joint, radially expands the end of the male member, thus forcing the blunted edge 17b into a sealing position in contact with the beveled portion 21.

Figure 10:
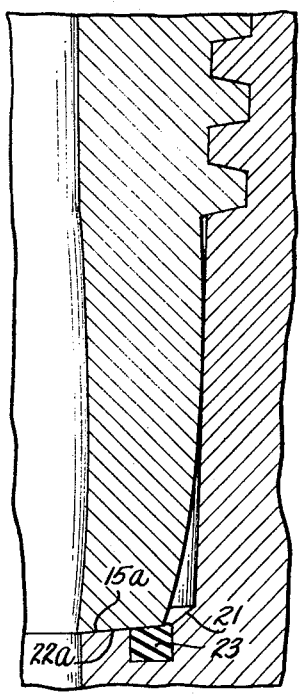
FIG. 10 shows a joint in which one of the principles underlying the invention has not been followed.

It should be noted that the unthreaded end portion 13 of the male member must be relatively short in proportion to its length, with the ratio of its length ($l$, FIG. 1) to its width ($w$, FIG. 1) lying between 0.9 and 2. If the unthreaded end of the male member is instead relatively long and thin, the internal pressure cooperating with the forces created by the making up of the joint deforms the unthreaded end portion as shown in FIG. 10, so that the surface 15a is slightly tilted and does not seal properly against the shoulder 22a. In extreme cases, the surface 15a may be forced completely off the shoulder.

The internal pressure also makes it preferable for the shoulder 22 to be slightly concave, and the end surface 15 matingly convex, so that the internal pressure tends to force the end surface 15 against the shoulder 22, thereby tightening the seal therebetween.

The beveled surface 21 is normally at an angle of about 45° to the longitudinal axis of the pipe, but this exact angle is not critical so that any angle between 35 and 55 is reasonably satisfactory, and angles outside this range will do in some cases. The angle between the beveled surface and a plane normal to the longitudinal axis of the joint must, of course, be greater than the angle of repose between the material of the male and female members, so that when torque is applied, the edge 17 slides down the beveled surface 21 instead of digging into it. On the other hand, the angle between the beveled surface and the longitudinal axis must be great enough so that the circle along which the beveled surface meets the shoulder 22 has a diameter less than the diameter of the circle defined by the undeformed edge 14. Normally this angle will be at least 10°.

From the foregoing it will be appreciated that, because of the slight clearance between the surfaces 14 and 20, there is no tendency of these surfaces to seize, and no resistance imposed thereby to the making up and separation of the joint. This clearance, taken with the inherent slight resilience of the end of the male member causes that end to cooperate with the beveled surface 21 of the female member somewhat like a self-centering valve member, thus producing a tight seal between the edge 17 and beveled surface 21 even when the end of the male member and the beveled surface are not exactly concentric, or after the edge 17 has become permanently deformed. This permits the allowance of greater tolerances during manufacture, and longer use of the joints after manufacture. This seal is, of course, in addition to the conventional seal between the end surface 15 and the shoulder 22 with its sealing ring 23.

It will also be appreciated that the specific embodiment illustrated may be modified as to detail without thereby departing from the basic principle of the invention.

What is claimed is:
1. A pipe joint comprising a tubular male member having a convex transverse end surface and a circumferential external surface which tapers inwardly to meet said end surface along an annular edge, said circumferential surface having a threaded portion and an unthreaded portion between said threaded portion and said edge, and a tubular female member provided near one end of its inner surface with a concave transverse shoulder, and an outwardly tapering internal surface between said shoulder and said one end, said outwardly tapering surface being provided with a threaded portion which mates with the threaded portion on said male member, and an unthreaded portion between the threaded portion on said female member and said shoulder, said unthreaded portions being dimensioned to provide a clearance therebetween while said joint is being made up, and a beveled surface connecting said unthreaded surface on said female member and said shoulder, the outer diameter of said beveled surface being at least as great as that of said annular edge and its inner diameter less than that of said annular edge, so that as said end of said male member is screwed into said female member said annular edge first seals against said beveled surface and the convex transverse end surface of said male member then comes to rest against said concave shoulder.

2. A joint as claimed in claim 1 in which said beveled surface is positioned at an angle of at least 10° with respect to the longitudinal axis of the joint and at an angle to a plane normal to said axis which is at least equal to the angle of repose of metal on metal.

3. A joint as claimed in claim 1 in which said beveled surface is positioned at an angle of between 35° and 55° relative to the longitudinal axis of said joint.

4. A joint as claimed in claim 1 in which said beveled surface is positioned at an angle of about 45° relative to the longitudinal axis of said joint.

5. A joint as claimed in claim 1 in which the transverse end surface of said male member is slightly convex and the shoulder of said female member is matingly concave.

6. A joint as claimed in claim 1 in which said shoulder is provided with a recess which receives a resilient sealing ring projecting, when uncompressed, slightly above the surface of said recess.

7. A joint as claimed in claim 1 in which said members are of substantially uniform inner diameter.

8. A joint as claimed in claim 1 in which the unthreaded portion of the circumferential surface on said male member encircles a longitudinally extending section of said male member having a length in the direction of the longitudinal axis of said joint equal to from .9 to 2 times the average thickness of said section.

References Cited

UNITED STATES PATENTS

| 2,006,520 | 7/1935 | Stone et al. | 285—334 |
| 2,111,627 | 3/1938 | Hinderliter | 285—333 X |
| 2,122,757 | 7/1938 | Scott | 285—334 |
| 3,359,013 | 12/1967 | Knox et al. | 285—334 X |

FOREIGN PATENTS

| 1,489,013 | 6/1967 | France. |

THOMAS F. CALLAGHAN, Primary Examiner

U.S. Cl. X.R.

285—334, 334.4